United States Patent
Choi et al.

(10) Patent No.: US 7,016,113 B2
(45) Date of Patent: Mar. 21, 2006

(54) LARGE SCALE POLARIZER AND POLARIZER SYSTEM EMPLOYING IT

(75) Inventors: Jae Beom Choi, Seoul (KR); Byung Duck Song, Kyungki-do (KR); Ki Hyuk Yoon, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/157,196

(22) Filed: May 30, 2002

(65) Prior Publication Data

US 2002/0141059 A1    Oct. 3, 2002

Related U.S. Application Data

(60) Division of application No. 09/618,165, filed on Jul. 17, 2000, which is a continuation of application No. 09/084,583, filed on May 27, 1998, now Pat. No. 6,292,296.

(30) Foreign Application Priority Data

May 28, 1997   (KR) .................................. 97-21140
Sep. 30, 1997  (KR) .................................. 97-50498

(51) Int. Cl.
*G02B 27/28*  (2006.01)
*G02B 5/30*   (2006.01)

(52) U.S. Cl. ....................... 359/487; 359/488; 359/497; 359/500

(58) Field of Classification Search ................ 359/485, 359/494, 500, 352, 483, 486, 487–488, 75–77, 359/497; 349/124, 154, 136; 362/19; 382/280; 434/21

See application file for complete search history.

(56) References Cited

U.S. PATENT DOCUMENTS

| | | | |
|---|---|---|---|
| 2,810,324 A | | 10/1957 | Marks |
| 3,912,920 A | | 10/1975 | Kubota |
| 4,063,281 A | * | 12/1977 | Kornreich et al. .......... 382/280 |
| 4,974,941 A | | 12/1990 | Gibbons et al. |
| 5,032,009 A | | 7/1991 | Gibbons et al. |
| 5,073,294 A | | 12/1991 | Shannon et al. |
| 5,200,238 A | * | 4/1993 | McArdle et al. ............... 428/1 |
| 5,224,860 A | * | 7/1993 | Waldman et al. ............ 434/21 |
| 5,296,321 A | | 3/1994 | Kawanishi et al. |
| 5,389,698 A | | 2/1995 | Chigrinov et al. |
| 5,447,662 A | | 9/1995 | Herr et al. |
| 5,453,862 A | | 9/1995 | Toko et al. |

(Continued)

FOREIGN PATENT DOCUMENTS

DE           44 20 585           12/1995

(Continued)

OTHER PUBLICATIONS

Hecht, "*Optics*," Addison-Wesley Publishing co., 2$^{nd}$ Edition, pp:298-299.

(Continued)

*Primary Examiner*—Leonidas Boutsikaris
(74) *Attorney, Agent, or Firm*—McKenna Long & Aldridge LLP

(57) ABSTRACT

A large scale polarizer comprises one or more quartz substrate parts formed as a rectangle, a triangle, or a parallelogram, and a polarizer holder supporting the quartz substrate part. The polarizer holder may be in a lattice structure holding a plurality of quartz substrate parts. A polarizer system employing the large scale polarizer comprises a lens making an incident light to a parallel light, the large scale polarizer, and a moving control part coupled to and moving the large scale polarizer.

6 Claims, 8 Drawing Sheets

U.S. PATENT DOCUMENTS

| | | | |
|---|---|---|---|
| 5,464,669 A | 11/1995 | Kang et al. | |
| 5,479,282 A | 12/1995 | Toko et al. | |
| 5,538,823 A | 7/1996 | Park et al. | |
| 5,539,074 A | 7/1996 | Herr et al. | |
| 5,576,862 A | 11/1996 | Sugiyama et al. | |
| 5,578,351 A | 11/1996 | Shashidhar et al. | |
| 5,602,661 A | 2/1997 | Schadt et al. | |
| 5,604,615 A * | 2/1997 | Iwagoe et al. | 349/124 |
| 5,657,105 A | 8/1997 | McCartney | |
| 5,712,696 A | 1/1998 | Toko et al. | |
| 5,764,326 A | 6/1998 | Hasegawa et al. | |
| 5,767,994 A | 6/1998 | Kang et al. | |
| 5,784,139 A | 7/1998 | Chigrinov et al. | |
| 5,824,377 A | 10/1998 | Pirwitz et al. | |
| 5,853,818 A | 12/1998 | Kwon et al. | |
| 5,859,682 A | 1/1999 | Kim et al. | |
| 5,882,238 A | 3/1999 | Kim et al. | |
| 5,889,571 A | 3/1999 | Kim et al. | |
| 5,909,265 A | 6/1999 | Kim et al. | |
| 5,934,780 A | 8/1999 | Tanaka | 362/19 |
| 5,982,466 A | 11/1999 | Choi et al. | |

FOREIGN PATENT DOCUMENTS

| | | |
|---|---|---|
| EP | 0 525 473 | 2/1993 |
| EP | 0 525 478 | 2/1993 |
| EP | 0 635 748 | 1/1995 |
| EP | 0 708 354 | 4/1996 |
| EP | 0 611 786 | 7/1996 |
| EP | 0 742 471 | 11/1996 |
| EP | 0 750 212 | 12/1996 |
| EP | 0 788 012 | 8/1997 |
| GB | 2 281 977 | 3/1955 |
| GB | 2 286 893 | 8/1995 |
| GB | 2 310 048 | 8/1997 |
| GB | 2 317 964 | 4/1998 |
| JP | 64-60833 | 3/1989 |
| JP | 1-251344 | 10/1989 |
| JP | 1-251345 | 10/1989 |
| JP | 2-55330 | 2/1990 |
| JP | 2-298917 | 12/1990 |
| JP | 3-36527 | 2/1991 |
| JP | 3-120503 | 5/1991 |
| JP | 3-241311 | 10/1991 |
| JP | 4-7520 | 1/1992 |
| JP | 4-284421 | 10/1992 |
| JP | 4-350822 | 12/1992 |
| JP | 5-19209 | 1/1993 |
| JP | 5-34699 | 2/1993 |
| JP | 5-53513 | 3/1993 |
| JP | 5-232473 | 9/1993 |
| JP | 7-56173 | 3/1995 |
| JP | 7-261185 | 10/1995 |
| JP | 7-318861 | 12/1995 |
| JP | 8-334790 | 12/1996 |
| JP | 9-211468 | 8/1997 |
| JP | 10-90684 | 1/1998 |
| JP | 10-154658 | 6/1998 |
| JP | 10-161126 | 6/1998 |
| JP | 10-332932 | 12/1998 |
| JP | 11-194344 | 7/1999 |
| JP | 11-194345 | 7/1999 |
| WO | 95/34843 | 12/1995 |
| WO | 96/22561 | 7/1996 |

OTHER PUBLICATIONS

Jenkins, Francis A., Harvey E. White, Fundamentals of Optics 3rd edition, pp: 492-493.

M. Nam et al., "Wide-Viewing-Angle TFT-LCD with Photo-Aligned Four-Domain TN Mode," SID 97 Digest, pp: 933-936.

M. Schadt et al., "Invited Paper: Optical Patterning of Multidomain LCDs," SID 97 Digest, pp: 397-400.

K. Han et al., "A Study on the Photo-Alignment of the Polymer-Containing Cinnamate Group Using a New Single UV-Exposure Method," SID 97 Digest, pp: 707-710.

F. Yamada et al., "Late-News Poster: A New Photo-Alignment Scheme for LC-Cell Pretilt Control," SID 97 Digest, pp: 715-718.

D. Seo et al., "Invited Address: Surface Alignment of Liquid Crystals in LCDs," SID 93 Digest, pp: 954-956.

Y. Iimura, "Invited Address: Prospects of the Photo-Alignment Technique for LCD Fabrication," SID 97 Digest, pp: 311-314.

R. Shashidhar et al., "A New Non-Rubbing Technique for Liquid-Crystal Alignment," SID 97 Digest, pp: 315-318.

K. Lee et al., "Late-News Poster: Mechanism of UV Modification of LC Pretilt Angle and Its Application to Two-Domain TN-LCDs," SID 96 Digest, pp: 638-641.

J. Kim et al., "Late News Poster: Photo-Alignment of Liquid Crystals Using a New Photopolymer," SID 96 Digest, pp: 646-649.

Y. Saitoh et al., "Stability of UV-Type Two-Domain Wide-Viewing Angle TFT-LCD Panels," SID 96 Digest, pp: 662-665.

J. Chen, "Model of liquid crystal alignment by exposure to linearly polarized ultraviolet light," Physical Review E, vol. 54, No. 2, Aug. 1996, pp: 1599-1603.

H. Soh et al., "The Realization of Wide Viewing Angle TFT-LCDs Using Photo-Alignment Method," Euro Display 96, pp: 579-582.

J. Chen, "Mechanism of Liquid-Crystal Alignment by Polyimide Exposure to Linearly Polarized UV Light," SID 96 Digest, pp: 634-637.

A. Lien, UV-Type Two-Domain Wide Viewing Angle TFT/LCD Panels, Asia Display 95, pp: 593-596.

T. Yamamoto, Liquid-Crystal Alignment by Slantwise Irradiation of Non-Polarized UV Light on a Polyimide Layer, SID 96 Digest, pp: 642-645.

M. Schadt et al., "Optical patterning of multi-domain liquid-crystal displays with wide viewing angles," Letters to Nature, vol. 381, May 16, 1996.

J. West et al., "Polarized UV-Exposed Polyimide Films for Liquid-Crystal Alignment," SID 95 Digest, pp: 703-705.

T. Hashimoto et al., "TN-LCD with Quartered Subpixels Using Polarized UV-Light-Irradiated Polymer Orientation Films," SID 95 Digest, pp: 877-880.

T. Saitoh et al., "A New Hybrid N-TB Mode LCD with Two Domain Pixels Fabricated Using a Photopolymer," Asia Display, pp: 589-592.

A. Lien et al., "UV modification of surface pretilt of alignment layers of multidomain liquid crystal displays," Appl. Phys. Lett. 62 (21), Nov. 20, 1995, pp: 3108-3111.

M. Hasegawa, "Nematic Homogeneous Photo Alignment by Polyimide Exposure to Linearly Polarized UV," Journal of Photopolymer Science and Technology, vol. 8, No. 2, 1995, pp: 241-248.

M. Schadt, "Investigation of the Mechanism of the Surface-Induced Alignment of Liquid Crystals by Linearly Polymerized Photopolymers," SID 95 Digest, pp: 528-531.

P. Shannon et al., "Patterned optical properties in photopolymerized surface-aligned liquid-crystal films," Letters to Nature, vol. 368, Apr. 7, 1994, pp: 532-533.

Y. Iimura et al., "Invited Address: Electro-Optic Characteristics of Amorphous and Super-Multidomain TN-

*LCDs Prepared by a Non-Rubbing Method,*" SID 94 Digest, pp: 915-918.

M. Schadt et al., *"Photo-Generation of Linearly Polymerized Liquid Crystal Aligning Layers Comprising Novel, Integrated Optically Patterned Retarders and Color Filters,"* Jpn. J. Appl. Phys. vol. 34 (1995), pp: 3240-3249, Part 1, No. 6A, Jun. 1995.

Kunihiro Ichimura, *"Photocontrol of Liquid Crystal Alignment,"* 1993.

T. Marushii et al., *"Photosensitive Orientants for Liquid Crystal Alignment,,"* Mol. Mat. 1993, vol. 3, pp: 161-168.

Y. Toko et al., *"TN-LCDs Fabricated by Non-Rubbing Showing Wide and Homogeneous Viewing Angular Characteristics and Excellent Voltage Holding Ratio,"* SID 93 Digest, pp: 622-625.

W. Gibbons et al., *"Surface-mediated alignment of nematic liquid crystals with polarized laser light,"* Letters to Nature, vol. 351, May 2, 1991, pp: 49-50.

Martin Schadt, *"Surface-Induced Parallel Alignment of Liquid Crystals by Linearly Polymerized Photopolymers,"* Jpn. J. Appl. Phys. vol. 31 (1992), Part 1, No. 7, Jul. 1992.

Yasufumi Iimura et al., *"Alignment Control of a Liquid Crystal on a Photosensitive Polyvinylalcohol Film,"* Jpn. J. Appl. Phys. vol. 32 (1993), Part. 2, No. 1A/B, Jan. 15, 1993.

Tong Kun Lim et al., *"Tilting of Liquid Crystal through Interaction with Methyl Orange Molecules Oriented by Circularly Polarized Light,"* Jpn. J. Appl. Phys., vol. 35 (1996), Part 2, No. 10A, Oct. 1, 1996, pp: 1281-1283.

* cited by examiner

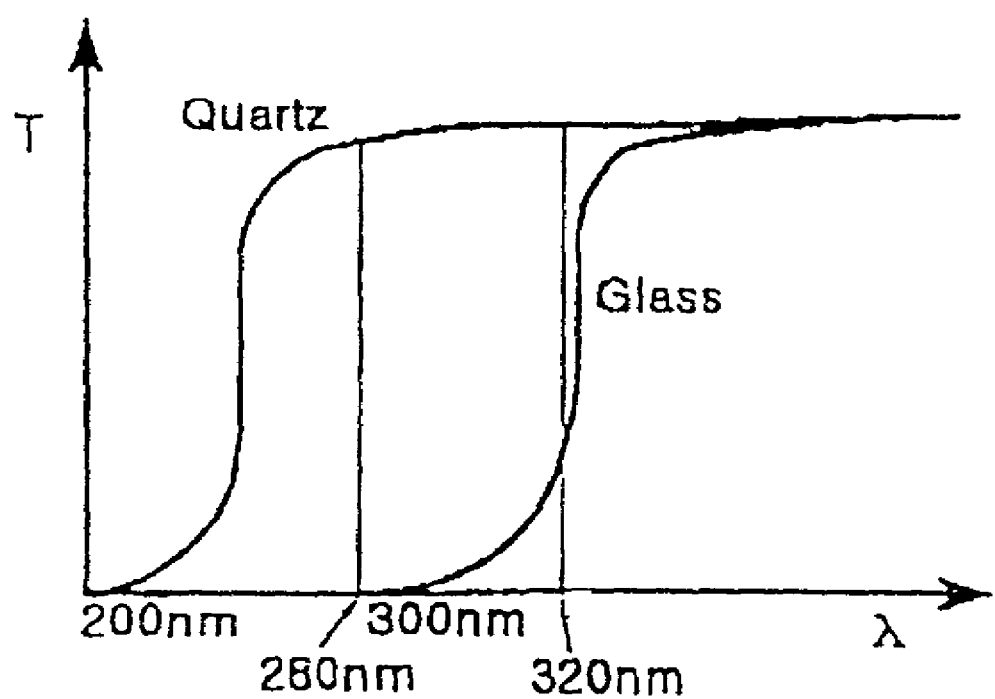

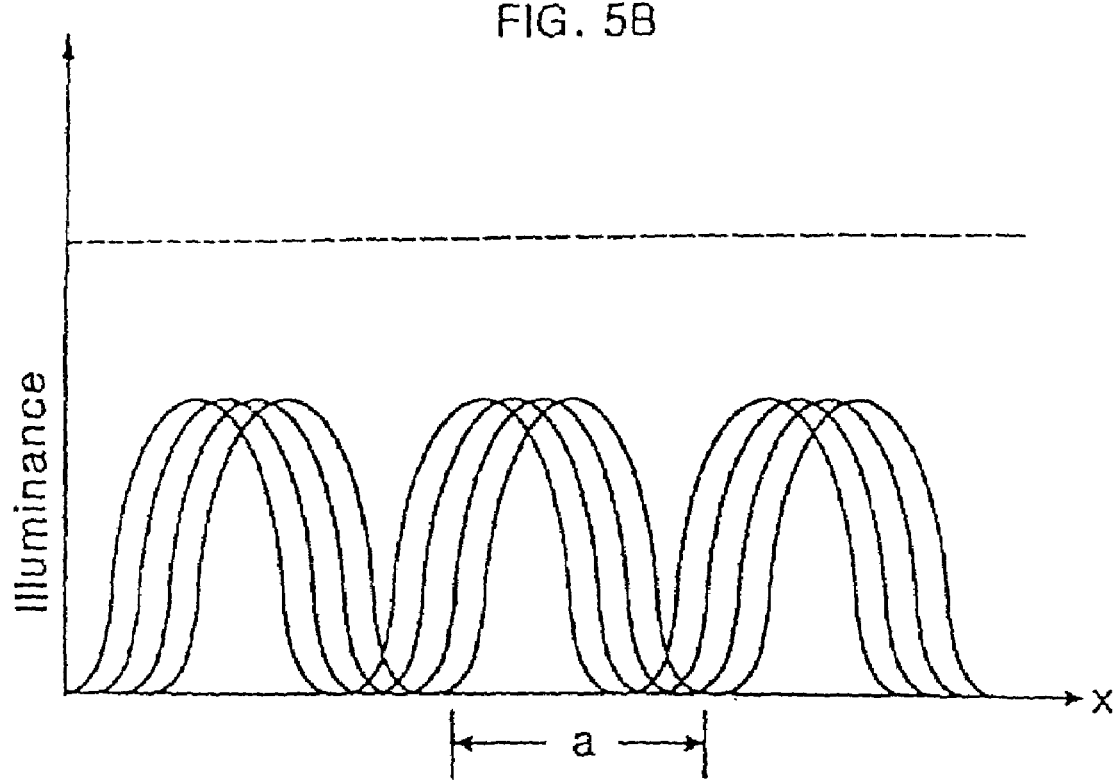

LARGE SCALE POLARIZER AND POLARIZER SYSTEM EMPLOYING IT

This application is a divisional of application Ser. No. 09/618,165 filed Jul. 17, 2000, which is a continuation of application Ser. No. 09/084,583, filed May 27, 1998, now U.S. Pat. No. 6,292,296 which is hereby incorporated by reference for all purposes as if fully set forth herein.

BACKGROUND OF THE INVENTION

A. Field of the Invention

The present invention relates to a polarizer and a polarizer system, and more particularly to a large scale polarizer and a polarizer system employing the large scale polarizer.

B. Description of the Related Art

Generally, a liquid crystal display device (LCD) comprises upper and lower substrates placed to face each other with a specific interval by a spacer, and a liquid crystal (LC) layer formed between the upper and lower substrates. The upper and lower substrates respectively have electrodes with specific patterns on their faced sides. And an alignment layer is formed over the electrodes to impart a pretilt angle on the LC.

For aligning the alignment layer, it has been proposed to use a rubbing method, a photo-alignment method or the like.

The rubbing method comprises depositing an alignment material, such as polyimide (PI), on a substrate and imparting the pretilt on the LC by rubbing the substrate with a rubbing cloth. Using this method, it is possible to make a large scale LCD and to align the alignment layer relatively quickly.

In the above described rubbing process, however, defects are generated by the microgrooves of the alignment layer which cause a light scattering and a random phase distortion. Moreover, dust particles and electrostatic discharge are produced in the alignment layer, so that a thin film transistor of the substrate is damaged and the yield is decreased.

On the other hand, the photo-alignment method imparts the pretilt on the LC by irradiating an ultraviolet light over a substrate having a photo-alignment layer. Compared with the rubbing method, there is no electrostatic discharge or dust particles, and thus the low yield problem is obviated. Moreover, it could control simultaneously the pretilt throughout the alignment layer, and this uniformly arrange the LC molecules. Therefore, there are several advantages, including preventing the random phase distortion or the light scattering from defects generated by the microgrooves.

At this time, to obtain a linearly or a partially polarized ultraviolet light, a polarizer polarizing an incident light from a light source is used. Particularly, the characteristics of the polarizer used in the photo-alignment process require that it be possible to apply to the large scale, to use in the ultraviolet light range, and to have an endurance, a heat resistance and a high light-transmittance.

In the conventional polarizer, however, because it is small, it is difficult to apply to the photo-alignment process of a large scale LCD. And in the case of the polarizer having an absorptive mode on which polymers are deposited, the endurance and heat resistance properties are poor, the wavelength of incident light is limited.

SUMMARY OF THE INVENTION

Accordingly, an object of the present invention to provide a large scale polarizer securing an uniformity of the illuminance thereof, for use in a photo-alignment process of fabricating a large scale LCD.

It is another object of the present invention to provide a polarizer system employing the large scale polarizer to simplify the process and to simplify a driving system of the polarizer.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the large scale polarizer of the present invention comprises: a plurality of quartz substrate parts, each quartz substrate part including one or more quartz substrates; and a polarizer holder supporting said plurality of quartz substrate parts.

In another aspect of the invention, the polarizer system employing the large scale polarizer of the present invention comprises: a light source for generating a light; a plurality of quartz substrate parts, each quartz substrate part including one or more quartz substrates; a polarizer holder supporting said plurality of quartz substrate parts; and means for directing said light onto said plurality of quartz substrate parts.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIG. 1 is a graph showing a light transmittance characteristic of quartz and glass.

FIG. 5B is a graph showing polarization characteristics of the polarizer system shown in the FIG. 5A.

DETAILED DESCRIPTION

Reference will now be made in detail to the present preferred embodiments of the invention, examples of which are illustrated in the accompanying drawings. Whenever possible, the same reference numbers will be used throughout the drawings to refer to the same or like parts.

Generally, a light used in a photo-alignment process is an ultraviolet light, and more particularly a light used as a polarized light is an ultraviolet light having a wavelength approximately between 280 nm and 320 nm. FIG. 1 is a graph showing a light transmittance characteristic of quartz and glass. As shown in the figure, from the light transmittance characteristics point of view, a quartz is more preferable than a glass.

Figure 2A:
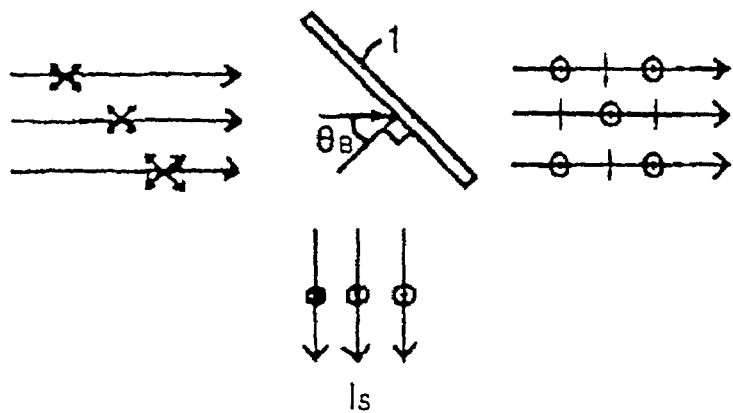
FIG. 2A shows polarization characteristics of a polarizer comprising one quartz substrate.
Figure 2B:
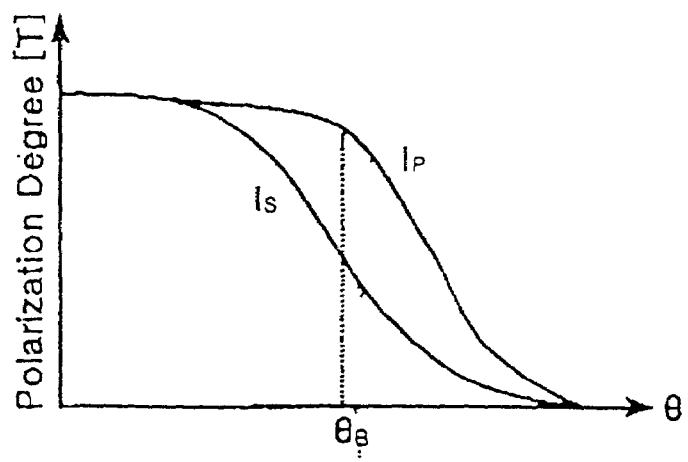
FIGS. 2B and 2C are graphs showing polarization characteristics of the polarizer shown in FIG. 2A.
Figure 2C:
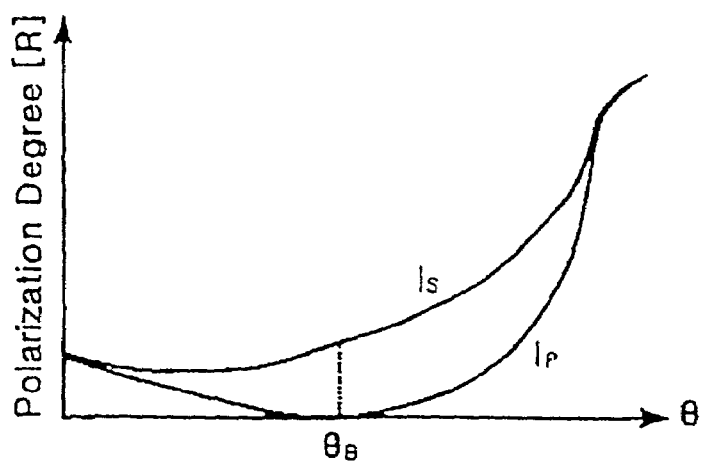

As shown in FIG. 2A, in the region irradiated by an unpolarized parallel light, a quartz substrate 1 is placed at the Brewster's $\theta_B$ angle with the incident light (that is, the normal of quartz substrate 1 and the incident light make the Brewster's angle $\theta_B$), and the light transmitted by quartz substrate 1 becomes a partially polarized light and the light reflected by quartz substrate 1 becomes a linearly polarized light. In FIG. 2A, the sign ⊙ indicates an S wave, that is, an S polarized light. $I_S$ represent the intensity of the S wave. The sign ⊙ represents a P wave, that is, a P polarized light. In FIGS. 2B and 2C, $\theta$ is the angle between a normal line of quartz substrate 1 and the incident light.

At this time, the Brewster's angle $\theta_B$ is described as follows. If the unpolarized light is incident on the surface of quartz substrate 1 at the Brewster's angle, the reflected light is made linearly polarized with the electric vector transverse to the plane of incidence. The transmitted light is partially polarized.

FIG. 2B is a graph showing a polarization degree of the light transmitted by quartz substrate 1, and FIG. 2C is a graph showing a polarization degree of the light reflected by quartz substrate 1.

As shown in FIG. 2B, the light transmitted by quartz substrate 1 becomes a partially polarized light in which a P polarized light $I_P$ is greater than $I_S$ at the Brewster's angle $\theta_B$. Further, as shown in FIG. 2C, the light reflected by quartz substrate 1 becomes a linearly polarized light in which only a S polarized light $I_S$ exists at the Brewster's angle $\theta_B$.

Figure 3A:
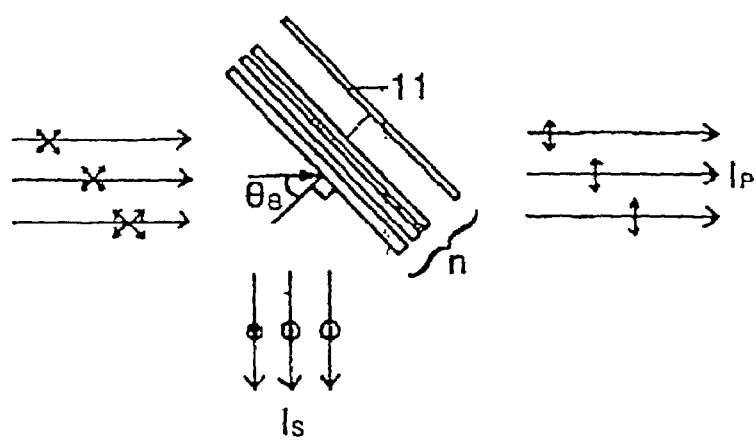
FIG. 3A shows polarization characteristics of a polarizer comprising two or more layers of quartz substrate.

On the other hand, as shown in FIG. 3A, in the region irradiated by an unpolarized parallel light, a layered quartz substrate 11, comprising one or more layers of quartz substrates, is placed to have the Brewster's angle $\theta_B$, and all of the light transmitted and reflected by layered quartz substrate 11 become linearly polarized. In FIG. 3A, the sign ↕represents a P wave, that is, a P polarized light, $I_P$ is the intensify of the P wave. And the sign ⊙ represents an S polarized light $I_S$ and $\theta$ is the an angle between a normal line of layered quartz substrate 11 and the incident light.

Figure 3B:
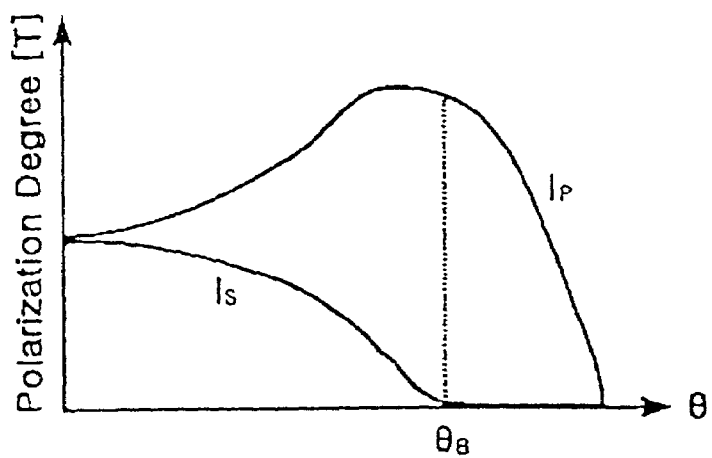
FIGS. 3B and 3C are graphs showing polarization characteristics of the polarizer shown in FIG. 3A.
Figure 3C:
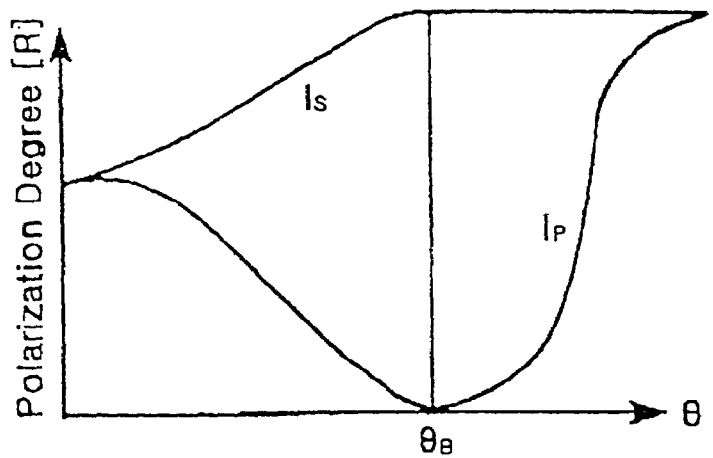

As shown in FIG. 3B, the light transmitted through layered quartz substrate 11 becomes a linearly polarized light in which only the P polarized light $I_P$ exists at the Brewster's angle $\theta_B$. Further, as shown in FIG. 2C, the light reflected by quartz substrate 1 becomes a linearly polarized light in which only a S polarized light $I_S$ exists at the Brewster's angle $\theta_B$.

As previously mentioned, when the number of the quartz substrates a linearly polarized light. Hence, it is possible to obtain a linearly or a partially polarized light easily by controlling the number of the quartz substrates.

Figure 4A:
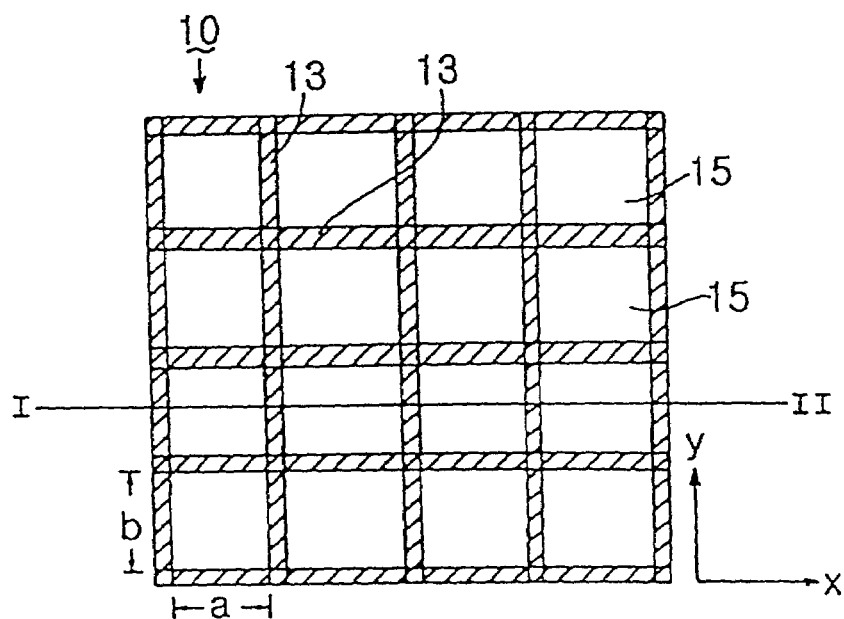
FIG. 4A is a plan view of a large scale polarizer according to an embodiment of the present invention.

FIG. 4A is a plan view of a large scale polarizer 10 according to an implementation of the present invention.

Large scale polarizer 10 comprises one or more quartz substrate parts 15 formed as a rectangle, and polarizer holders 13 formed as a lattice structure supporting quartz substrate part 15.

Each quartz substrate part 15 comprises one or more layers of quartz substrates, polarizes an incident light, and is positioned at the Brewster's angle against the incident light. Polarizer holder 13 includes an optically absorptive material. The marks a and b represent the interval between adjacent polarizer holders 13 in X axis and Y axis.

Compared with the conventional polarizer, in the present large scale polarizer, a plurality of quartz substrate parts 15 are linked by polarizer holders 13 like a lattice structure, and it is possible to apply to a large scale LCD.

Figure 4B:
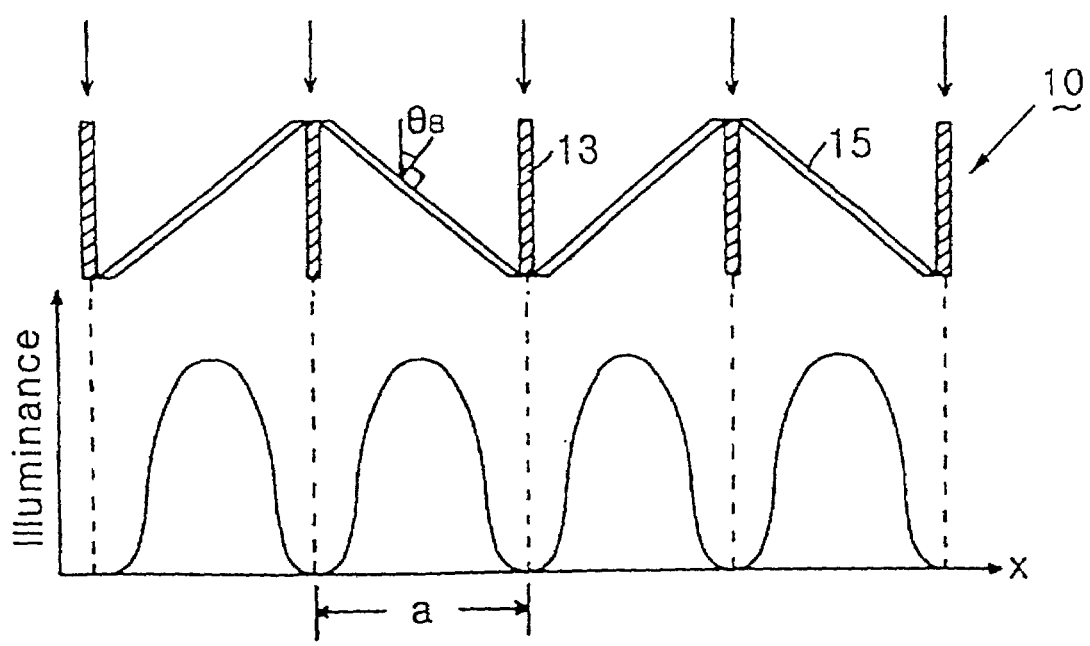
FIG. 4B is a graph showing a polarizing characteristic of the large scale polarizer shown in FIG. 4A.

FIG. 4B is a graph showing polarizing characteristics of the large scale polarizer shown in FIG. 4A, and shows also a sectional view taken along the line I–II of the large scale polarizer.

As shown in FIG. 4B, quartz substrate part 15 is formed between each polarizer holder 13 to have a Brewster's angle $\theta_B$ against the unpolarized parallel light of incidence. Thus, the light of incidence is normal to the surface of polarizer holder 13 and hence, quartz substrate part 15 forms the Brewster's angle relative to the normal to the surface of polarizer holder 13.

Figure 5A:
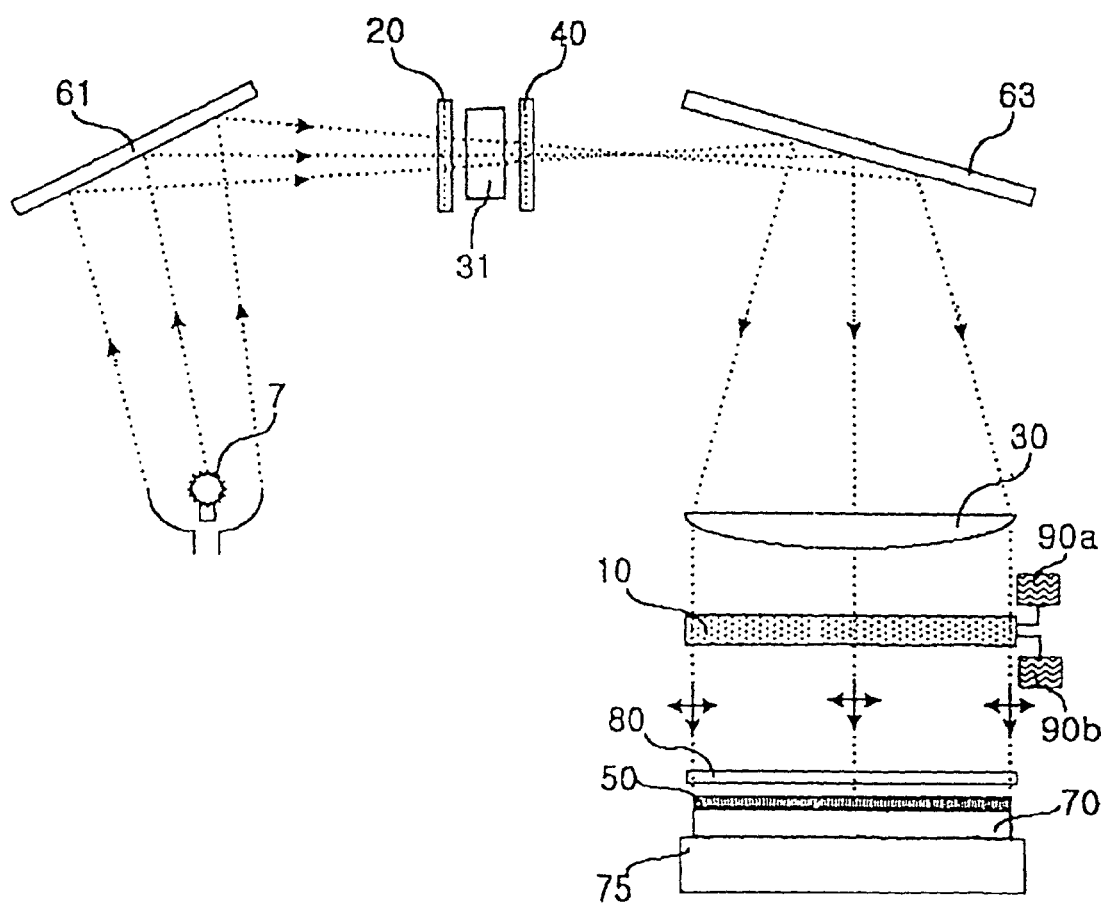
FIG. 5A shows a polarizer system employing the large scale polarizer shown in FIG. 4A.

Among the unpolarized parallel lights of incidence, the light reflected by quartz substrate part 15 is absorbed by polarizer holder 13, and the light transmitted by quartz substrate part 15 is irradiated over an alignment layer 50 (see FIG. 5A). At this time, polarizer holder 13 includes an optically absorptive material, and preferably includes a material whose optical absorptivity is almost 100%.

In large scale polarizer 10, the polarization degree needed is obtained by controlling the number of layers of the quartz substrates in quartz substrate part 1 S. Therefore, if it is desired to obtain a linearly polarized light according to a characteristic of the photo-alignment, the quartz substrate part is formed by using layers of quartz substrate having over a specific number of quartz substrate. And, to obtain a partially polarized light, the quartz substrate part is formed of one or any appropriate number of quartz substrates.

Furthermore, since the large scale polarizer consistent with the present invention, as compared with the conventional polarizer, does not select an absorption mode, it should be possible to use semi-permanently, its endurance is good, and there is no dependence of wavelength.

As shown in FIG. 4B, as to large scale polarizer 10, the illuminance of the light transmitted by the large scale polarizer is uneven according to the position on alignment layer 50 caused by polarizer holder 13. That is, the illuminance is relatively high in the middle of quartz substrate part 15; the illuminance is low near polarizer holder 13; and the incident light is not transmitted directly underneath polarizer holder 13.

FIG. 5A shows a polarizer system employing large scale polarizer 10 shown in FIG. 4A.

A light from a lamp 7 is reflected by a cold mirror 61 onto a small scale polarizer 20, focused by a fly eye lens (homogenizer) 31, and transmitted by another small scale polarizer 40. The light is reflected again by a reflective mirror 63 onto a collimation lens, the light recollimated and focused becomes an unpolarized parallel light. The unpolarized parallel light is incident at the Brewster's angle $\theta_B$ on the quartz substrate part of large scale polarizer 10. And a part of the light is reflected, and other part of the light is transmitted and irradiated over an alignment layer 50 on a substrate 70 supported on a stage 75 after passing a mask 80.

Moreover, the polarizer system further comprises a first moving control party 90a moving the large scale polarizer in the X axis direction and second moving control part 90b moving the large scale polarizer in the Y axis direction in FIG. 4A during the photo-alignment stage. Although only one configuration and one set of components are described hereinabove (such as cold mirror and fly eye lense), many other configurations and components may be substituted, as needed.

To obtain the uniformity of the illuminance of the light irradiated on alignment layer 50, it is preferable that large scale polarizer 10 is placed having a specific interval from alignment layer 50. This is because the polarizer holder makes the illuminance of the light reaching on the alignment layer uneven depending on the position as shown in FIG. 4B.

FIG. 5B is a graph showing polarization characteristics of the polarizer system shown in the FIG. 5A.

When first moving control part 90a makes large scale polarizer 10 move in a specific direction (for example, along the X axis in FIG. 4A) at a specific distance during the photo-alignment stage, as shown in FIG. 5B, the illuminance of alignment layer 50 is made uniform in the whole position along the X axis. In FIG. 5B, the curved line represents an illuminance in a specific point during the photo-alignment process, and the dotted line represents and average illuminance over the whole photo-alignment process. Mark a is distance between the adjacent polarizer holders on the X axis.

Therefore, in connection with performing the photo-alignment process using the polarizer system employing the large scale polarizer, when the distance between the adjacent polarizer holders along the X axis is a, first moving control part 90a oscillates large scale polarizer 10 for a distance of a±δ(δ<<a) one or more times along the X axis during the photo-alignment stage. In the same manner, when the distance between the adjacent polarizer holders along the Y axis is b, second moving control part 90b oscillates large scale polarizer 10 move in one way for a distance of b±δ(δ<<b) one or more times along the Y axis during the photo-alignment stage.

Accordingly, when the large scale polarizer moves in the manner described above, the uneven illuminance shown in FIG. 4B is made uniform.

Although FIG. 5B shows only the sectional view taken along the X axis of FIG. 4A, the same results are observed in the sectional view taken along the Y axis.

Figure 6:
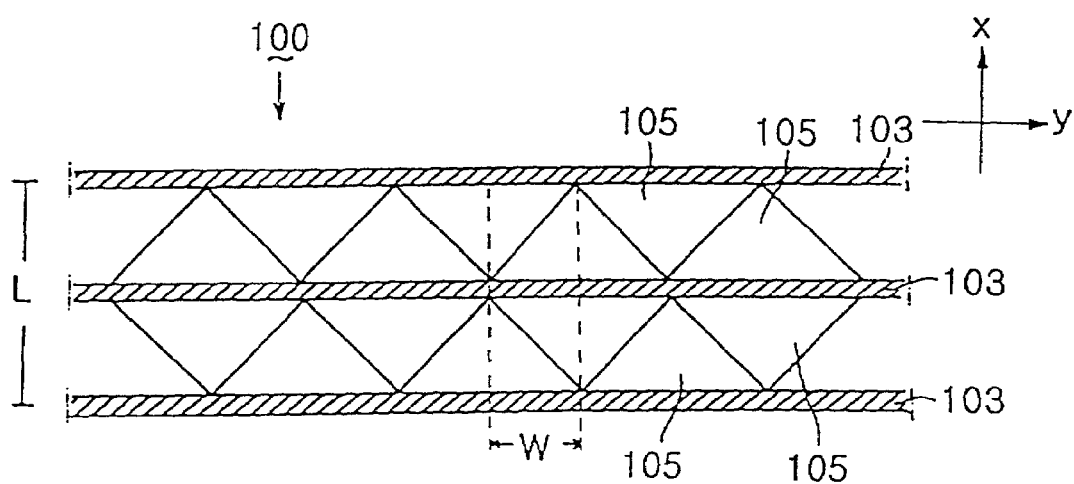
FIG. 6 is a plan view of a large scale polarizer according to other embodiment of the present invention.

FIG. 6 is a plan view of a large scale polarizer according to another embodiment of the present invention.

In FIG. 6, a large scale polarizer 100 comprises one or more quartz substrate parts 105 formed as a triangle, and a polarizer holder 103 supporting quartz substrate part 105. Quartz substrate part 105 comprises one or more layers of quartz substrate, and the quartz substrate parts are linked in one direction.

With the above triangular configuration, large scale polarizer 100 obtains a uniform illuminance by scanning only along the X axis. For example, although it scans in lengths of L along the X axis, the whole area irradiated is given equally the effects of the boundary line between the quartz substrate parts (an area of width of W in the figure), and the non-irradiated area by the polarizer holder is covered evenly.

Figure 7:
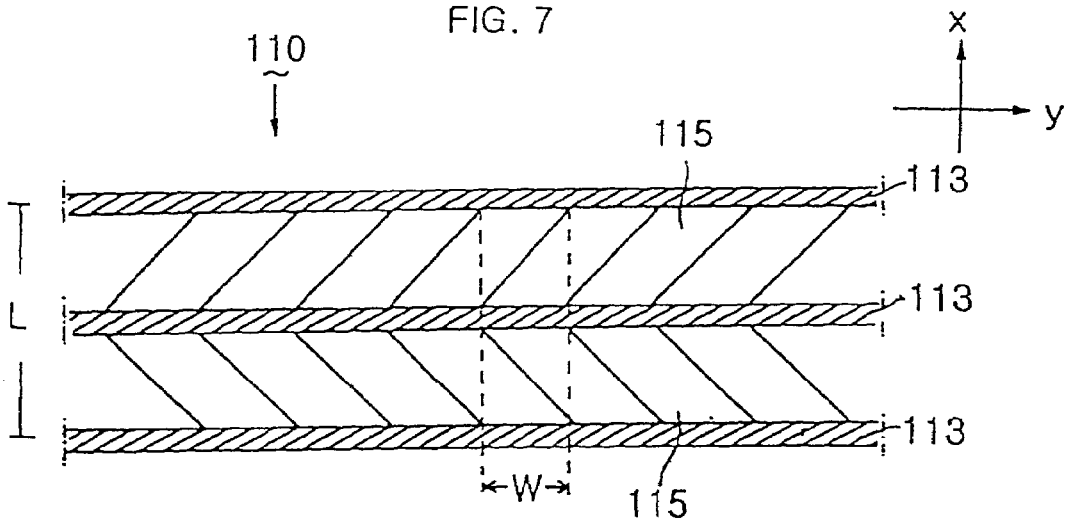
FIG. 7 is a plan view of a large scale polarizer according to further embodiment of the present invention.

FIG. 7 is a plan view of a large scale polarizer according to another embodiment of the present invention.

A large scale polarizer 110 comprises one or more quartz substrate parts 115 formed in a parallelogram configuration, and a polarizer holder 113 supporting quartz substrate part 115. Quartz substrate part 115 comprises one or more layers of quartz substrate, and the quartz substrate parts are linked in one direction.

With the above parallelogram configuration, large scale polarizer 110 obtains a uniform illuminance by moving only along the X axis. For example, although it scans in lengths of L along the S axis, the whole area irradiated is given equally the effects of the boundary line between the quartz substrate parts (an area of width of W in the figure), and the non-irradiated area by the polarizer holder is covered evenly. Moreover, compared with quartz substrate part 105 in FIG. 6, this quartz substrate parts 115 of the parallelogram are assembled more easily.

Figure 8:
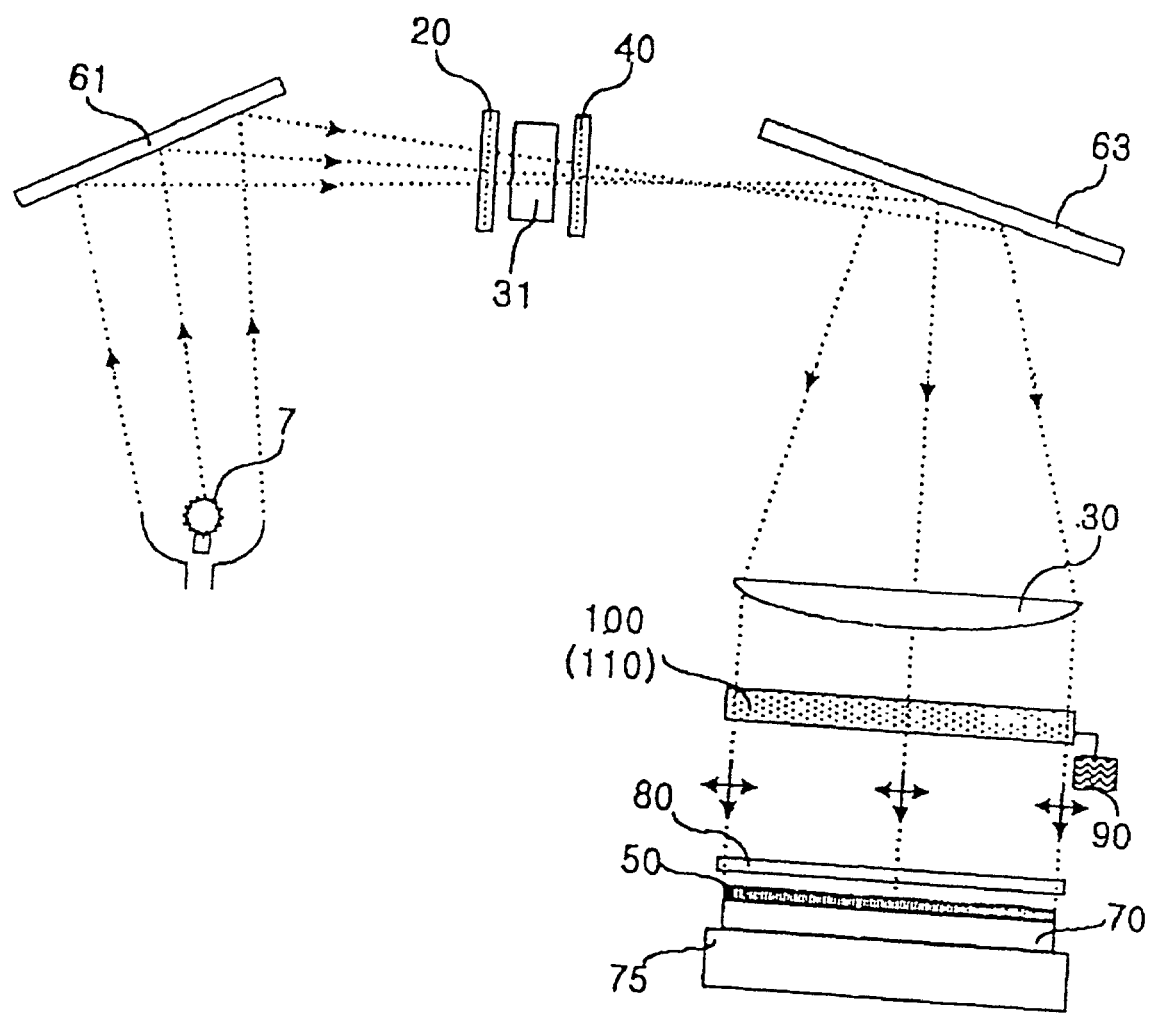
FIG. 8 shows a polarizer system employing the large scale polarizer shown in FIG. 6 or 7.

FIG. 8 shows a polarizer system employing the large scale polarizer shown in FIG. 6 or 7.

A light from a lamp 7 is reflected by a cold mirror 61 onto a small scale polarizer 20, focused by a fly eye lens (homogenizer) 31, and transmitted through another small scale polarizer 40. The light if reflected again by a reflective mirror 63 onto a collimation lens 30, the light recollimated and focused becomes an unpolarized parallel light. The unpolarized parallel light is incident at the Brewster's angle $\theta_B$ on the quartz substrate part of large scale polarizer 100 (or 110) (see the FIGS. 6 and 7). And a part of the light is reflected, and other part of the light is transmitted and irradiated over an alignment layer 50 on a substrate 70 supported on a stage 75 after passing through a mask 80. And, a moving control part 90 is connected with and moves the large scale polarizer.

A part of the light is reflected, and other part of the light is transmitted and irradiated over alignment layer 50. Moving control part 90 makes the large scale polarizer move in the X axis direction during the irradiation of the photo-alignment layer (refer to FIGS. 6 and 7).

In the above polarizer system of FIG. 6 or 7, because the structure of the quartz substrate used is a triangle or a parallelogram, a uniform illuminance could be obtained by moving in only one direction along either the X or Y direction, the direction being perpendicular to the polarizer holder. Therefore, one-directional movement reduces the number of the processes, and as a result, the number of the moving control parts needed is fewer, and then the cost of manufacture is reduced.

Moreover, although the polarizer systems shown in FIGS. 5A and 8 have one large scale polarizer and two small scale polarizers in front and behind of het fly eye lens, it is possible to use one, two or all of them depending on the situation. The number and position of the polarizers are flexible. For example, in the case of using one polarizer, the polarizer may be placed at 10 (100), 20 or 40 in FIGS. 5A and 8. In the case of using two polarizers, the polarizers may be placed at 10 (100) and 20, 20 and 40, or 10 (100) and 40 in FIGS. 5A and 8. When three polarizers are used, polarizers may be placed at 10 (100), 20 and 40 in FIGS. 5A and 8.

It is further understood by those skilled in the art that the foregoing description is a preferred embodiment of the disclosed device and that various changes and modifications may be made in the invention without departing from the spirit and scope thereof.

It will be apparent to those skilled in the art that various modifications and variations can be made in the polarizer and polarizer system of the present invention and in construction thereof without departing from the scope or spirit of the invention. As an example, while the embodiments discussed above place the polarizer at the Brewster's angle, it need not be at the Brewster's angle. Moreover, the movement of the polarizer is not limited to the particular X and Y directions described above—it may be moved in any fashion as long as the alignment layer is uniformly irradiated, as needed.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polarizer system for treating an alignment layer on a substrate, comprising:
   a light source for generating a light;
   a lens;
   at least a first polarizer including a quartz substrate adjacent the lens, the quartz substrate including an optically absorptive polarizer holder and a plurality of quartz substrate parts, the plurality of quartz substrate parts including first sections at a first angle with respect to the lens and second sections at a second angle with respect to the lens, wherein the first sections are not parallel to the second sections and wherein the optically absorptive polarizer holder is in contact with edges of the first and second sections; and
   a support member for supporting a substrate having an alignment layer thereon, the polarizer being positioned between the light source and the support member.

2. The polarizer system according to claim 1, wherein the lens includes a collimating lens and the collimating lens is positioned between the first polarizer and the light source.

3. The polarizer system according to claim 2, further comprising a second polarizer and a second lens, the second polarizer and the second lens being positioned between the light source and the first polarizer.

4. The polarizer system according to claim 1, further comprising a first moving control part for moving the first polarizer in an X-direction with respect to the support member and a second moving control part for moving the first polarizer in a Y-direction with respect to the support member.

5. The polarizer system according to claim 1, wherein the first polarizer is maintained at a predetermined distance from the support member.

6. The polarizer system according to claim 1, wherein the optically absorptive polarizer holder includes a lattice structure.

* * * * *